United States Patent
Machida

(10) Patent No.: US 8,565,489 B2
(45) Date of Patent: *Oct. 22, 2013

(54) IMAGE ANALYSIS APPARATUS, IMAGE PROCESSING APPARATUS, AND IMAGE ANALYSIS METHOD

(75) Inventor: Yoshihito Machida, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/617,997

(22) Filed: Sep. 14, 2012

(65) Prior Publication Data

US 2013/0011021 A1 Jan. 10, 2013

Related U.S. Application Data

(63) Continuation of application No. 12/731,435, filed on Mar. 25, 2010, now Pat. No. 8,295,553.

(30) Foreign Application Priority Data

Apr. 2, 2009 (JP) .................................. 2009-090484

(51) Int. Cl.
*G06K 9/00* (2006.01)
*A61B 6/00* (2006.01)

(52) U.S. Cl.
USPC .................................. 382/107; 378/4; 378/8

(58) Field of Classification Search
USPC .............. 382/128–134, 190, 236, 103, 107;
378/4, 21–27, 46, 62, 101, 901, 8, 90;
600/407, 410, 411, 425, 427, 435, 437;
348/154, 155, 169
See application file for complete search history.

(56) References Cited

U.S. PATENT DOCUMENTS 6,330,303 B1 * 12/2001 Yamane et al. ............... 378/98.8
7,085,342 B2 * 8/2006 Younis et al. ..................... 378/8

(Continued)

FOREIGN PATENT DOCUMENTS

JP 7-255717 10/1995
JP 2000-101840 4/2000 ............. H04N 1/407

(Continued)

OTHER PUBLICATIONS

Viola et al., "Alignment by Maximization of Mutual Information", *International Journal of Computer Vision*, vol. 24, No. 2, pp. 137-154 (1997).

(Continued)

*Primary Examiner* — Abolfazl Tabatabai
(74) *Attorney, Agent, or Firm* — Fitzpatrick, Cella, Harper & Scinto

(57) ABSTRACT

An image analysis apparatus includes a moving image input unit which accepts an input of a moving image of a subject irradiated with X-rays, a determination unit which analyzes the previous frame and current frame of the moving image, and determines based on the analysis result whether or not any of a change in relative position between an exposure field of the X-rays and an observation portion of the subject, a change in imaging condition of the moving image, and a change in observation portion of the subject is detected, and a feature amount setting unit which sets feature amounts extracted from the current frame in the current frame when the determination unit determines that any of the changes is detected, and sets feature amounts set in the previous frame in the current frame when the determination unit determines that no change is detected.

12 Claims, 14 Drawing Sheets

(56) References Cited

U.S. PATENT DOCUMENTS

| | | | |
|---|---|---|---|
| 7,526,061 B2* | 4/2009 | Kobayashi | 378/4 |
| 2002/0146071 A1 | 10/2002 | Liu et al. | 375/240.16 |
| 2003/0190067 A1 | 10/2003 | Tsujii | 382/132 |
| 2004/0008903 A1 | 1/2004 | Kim | 382/274 |
| 2005/0111717 A1 | 5/2005 | Yoshioka et al. | 382/128 |
| 2005/0207669 A1 | 9/2005 | Kameyama | 382/274 |
| 2006/0120581 A1 | 6/2006 | Eck et al. | 382/128 |
| 2007/0081711 A1 | 4/2007 | Kim et al. | 382/128 |
| 2008/0056445 A1 | 3/2008 | Spahn | 378/62 |
| 2008/0199048 A1 | 8/2008 | Eck et al. | 382/107 |
| 2009/0169080 A1 | 7/2009 | Noordhoek | 382/131 |
| 2010/0260386 A1 | 10/2010 | Machida | 382/107 |
| 2012/0008737 A1 | 1/2012 | Lechsel et al. | 378/19 |

FOREIGN PATENT DOCUMENTS

| | | | |
|---|---|---|---|
| JP | 2000-271107 | 10/2000 | A61B 6/00 |
| JP | 2003-033968 | 2/2003 | B65D 25/20 |
| JP | 2004-000411 | 1/2004 | |
| JP | 2005-111151 | 4/2005 | |
| JP | 2005-269542 | 9/2005 | H04N 5/21 |

OTHER PUBLICATIONS

Maes et al., "Multimodality Image Registration by Maximization of Mutual Information", *IEEE Transactions on Medical Imaging*, vol. 16, No. 2, pp. 187-198 (1997).

J. Little et al., "Recognizing People by their Gait: The Shape of Motion", Videre: Journal of Computer Vision, vol. 1, No. 2, pp. 1-33 (1998).

Office Action issued Aug. 28, 2012, in co-pending U.S. Appl. No. 12/750,876.

A. Rav-Acha et al., "Two Motion-Blurred Images Are Better Than One", *Pattern Recognition Letters*, vol. 26, pp. 311-317 (2005).

Office Action issued Feb. 13, 2013, in co-pending U.S. Appl. No. 12/750,876.

* cited by examiner

|  | ANALYSIS VALUE AT ACQUISITION TIMING OF CURRENT FRAME | ANALYSIS VALUE AT ACQUISITION TIMING OF PREVIOUS FRAME | ANALYSIS VALUE DIFFERENCE |
| --- | --- | --- | --- |
| MINIMUM VALUE | 1280 | 1230 | −50 |
| INTERMEDIATE VALUE | 2048 | 2100 | 52 |
| MAXIMUM VALUE | 2688 | 2900 | 212 |

FIG. 8A

| | | POSITION (cm) FROM ORIGIN AT ACQUISITION TIMING OF CURRENT FRAME IMAGE | POSITION (cm) FROM ORIGIN AT ACQUISITION TIMING OF PREVIOUS FRAME IMAGE | ANALYSIS VALUE DIFFERENCE (cm) |
|---|---|---|---|---|
| X-RAY TUBE MOVING AMOUNT | X(X-RAY TUBE MOVING AMOUNT) | 2 | 2 | 0 |
| | Y(X-RAY TUBE MOVING AMOUNT) | 3 | 3 | 0 |
| | Z(X-RAY TUBE MOVING AMOUNT) | 1 | 1 | 0 |
| BED MOVING AMOUNT | X(BED MOVING AMOUNT) | -5 | 5 | 10 |
| | Y(BED MOVING AMOUNT) | -3 | 2 | 5 |
| | Z(BED MOVING AMOUNT) | 0 | 0 | 0 |
| X-RAY SENSOR MOVING AMOUNT | X(X-RAY SENSOR MOVING AMOUNT) | -5 | 5 | 10 |
| | Y(X-RAY SENSOR MOVING AMOUNT) | -4 | 1 | 5 |
| | Z(X-RAY SENSOR MOVING AMOUNT) | 0 | 0 | 0 |

FIG. 8B

| | | POSITION (cm) FROM ORIGIN AT ACQUISITION TIMING OF CURRENT FRAME IMAGE | POSITION (cm) FROM ORIGIN AT ACQUISITION TIMING OF PREVIOUS FRAME IMAGE | ANALYSIS VALUE DIFFERENCE (cm) |
|---|---|---|---|---|
| X-RAY TUBE MOVING AMOUNT | X(X-RAY TUBE MOVING AMOUNT) | 2 | -8 | 10 |
| | Y(X-RAY TUBE MOVING AMOUNT) | 3 | -7 | 10 |
| | Z(X-RAY TUBE MOVING AMOUNT) | 1 | -4 | 5 |
| BED MOVING AMOUNT | X(BED MOVING AMOUNT) | -5 | -15 | 10 |
| | Y(BED MOVING AMOUNT) | -3 | -13 | 10 |
| | Y(BED MOVING AMOUNT) | 0 | -5 | 5 |
| X-RAY SENSOR MOVING AMOUNT | X(X-RAY SENSOR MOVING AMOUNT) | -5 | -15 | 10 |
| | Y(X-RAY SENSOR MOVING AMOUNT) | -4 | -14 | 10 |
| | Z(X-RAY SENSOR MOVING AMOUNT) | 0 | -5 | 5 |

FIG. 9A

| | IMAGING CONDITION AT ACQUISITION TIMING OF CURRENT FRAME IMAGE | IMAGING CONDITION AT ACQUISITION TIMING OF PREVIOUS FRAME IMAGE | IMAGING CONDITION DIFFERENCE |
|---|---|---|---|
| TUBE VOLTAGE (kV) | 120 | 115 | 5 |
| TUBE CURRENT (mA) | 800 | 750 | 50 |
| IRRADIATION TIME (ms) | 50 | 50 | 0 |
| FRAME RATE (fps) | 30 | 30 | 0 |

FIG. 9B

| | IMAGING CONDITION AT ACQUISITION TIMING OF CURRENT FRAME IMAGE | IMAGING CONDITION AT ACQUISITION TIMING OF PREVIOUS FRAME IMAGE | IMAGING CONDITION DIFFERENCE |
|---|---|---|---|
| TUBE VOLTAGE (kV) | 120 | 118 | 2 |
| TUBE CURRENT (mA) | 800 | 800 | 0 |
| IRRADIATION TIME (ms) | 50 | 50 | 0 |
| FRAME RATE (fps) | 30 | 30 | 0 |

FIG. 10A

| RESPIRATION PHASE | BIOLOGICAL INFORMATION AT ACQUISITION TIMING OF CURRENT FRAME IMAGE | BIOLOGICAL INFORMATION AT ACQUISITION TIMING OF PREVIOUS FRAME IMAGE | BIOLOGICAL INFORMATION VARIATION |
|---|---|---|---|
| | EXPIRATORY PHASE | INSPIRATORY PHASE | INSPIRATORY PHASE - EXPIRATORY PHASE |

FIG. 10B

| RESPIRATION PHASE | BIOLOGICAL INFORMATION AT ACQUISITION TIMING OF CURRENT FRAME IMAGE | BIOLOGICAL INFORMATION AT ACQUISITION TIMING OF PREVIOUS FRAME IMAGE | BIOLOGICAL INFORMATION VARIATION |
|---|---|---|---|
| | EXPIRATORY PHASE | EXPIRATORY PHASE | EXPIRATORY PHASE - EXPIRATORY PHASE |

FIG. 11A

| ANALYSIS / DETERMINATION TYPE | | ANALYSIS / DETERMINATION RESULT |
|---|---|---|
| IMAGE VARIATION | MINIMUM VALUE | -20 |
| | INTERMEDIATE VALUE | -30 |
| | MAXIMUM VALUE | -40 |
| RELATIVE POSITION CHANGE | | RELATIVE POSITION CHANGE NOT DETECTED |
| IRRADIATION CONDITION CHANGE | | IRRADIATION CONDITION CHANGE NOT DETECTED |
| BIOLOGICAL INFORMATION VARIATION | | EXPIRATORY PHASE - EXPIRATORY PHASE |

FIG. 11B

| ANALYSIS / DETERMINATION TYPE | | ANALYSIS / DETERMINATION RESULT |
|---|---|---|
| IMAGE VARIATION | MINIMUM VALUE | 100 |
| | INTERMEDIATE VALUE | 150 |
| | MAXIMUM VALUE | 100 |
| RELATIVE POSITION CHANGE | | RELATIVE POSITION CHANGE DETECTED |
| IRRADIATION CONDITION CHANGE | | IRRADIATION CONDITION CHANGE DETECTED |
| BIOLOGICAL INFORMATION VARIATION | | INSPIRATORY PHASE - INSPIRATORY PHASE |

FIG. 11C

| ANALYSIS / DETERMINATION TYPE | | ANALYSIS / DETERMINATION RESULT |
|---|---|---|
| IMAGE VARIATION | MINIMUM VALUE | 50 |
| | INTERMEDIATE VALUE | 60 |
| | MAXIMUM VALUE | 100 |
| RELATIVE POSITION CHANGE | | RELATIVE POSITION CHANGE NOT DETECTED |
| IRRADIATION CONDITION CHANGE | | IRRADIATION CONDITION CHANGE NOT DETECTED |
| BIOLOGICAL INFORMATION VARIATION | | INSPIRATORY PHASE - EXPIRATORY PHASE |

F I G. 15C
| MINIMUM VALUE | 1000 |
|---|---|
| INTERMEDIATE VALUE | 2000 |
| MAXIMUM VALUE | 3000 |
F I G. 16
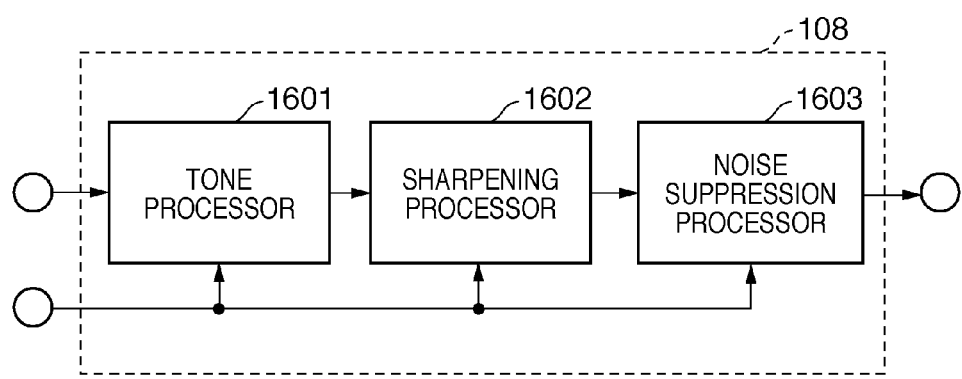

IMAGE ANALYSIS APPARATUS, IMAGE PROCESSING APPARATUS, AND IMAGE ANALYSIS METHOD

CROSS REFERENCE TO RELATED APPLICATION

This application is a continuation of U.S. application Ser. No. 12/731,435 filed on Mar. 25, 2010, the entire disclosure of which is hereby incorporated by reference herein.

BACKGROUND OF THE INVENTION

1. Field of the Invention

The present invention relates to an image processing technique that inputs a moving image and corrects the moving image and, more particularly, to an image analysis technique and image processing technique which extract feature amounts of a moving image.

2. Description of the Related Art

Conventionally, various image correction techniques have been proposed to improve image data. Feature amounts of a moving image may include color, luminance, tone, brightness, hue and chroma of that image data. An image correction technique may, for example, extract these feature amounts from an image and apply tone correction, sharpness correction, color balance correction, white balance correction, and exposure correction to the image data based on the extracted feature amounts.

The aforementioned image correction technique can be applied to image correction of not only a still image but also a moving image. By applying the aforementioned corrections to each frame (to be referred to as a "frame image" hereinafter) that forms a moving image, the image quality can be corrected.

However, when the aforementioned image correction technique is applied to a moving image, since it executes correction processing for each frame, correction values of a current frame may often be different from those of the previous and next frames, and these correction value differences may be recognized as image quality variations. In particular, when a moving image has a small motion from one frame to the next, the image correction may be excessively applied due to errors of feature amounts, and such correction result may be recognized as deterioration. As a method of solving this problem, a method of smoothing feature amounts extracted from the current frame image and those extracted from the previous frame image, and setting the smoothed feature amounts as those of the current frame, is possible. However, with this method, when a large change occurs between frames, feature amounts cannot be changed to a large enough extent, resulting in a poor result.

As a method of solving the problem regarding this poor result, a method to correct the feature amounts of the current frame image and set the corrected feature amounts as those of both the previous and next frame images has been proposed (Japanese Patent Laid-Open No. 2005-269542). More specifically, tentative feature amounts are calculated and are adjusted according to a result of a cut point analysis unit to set them as feature amounts.

However, when feature amounts of a moving image are to be calculated, as described above, often they may be different for different (e.g. the prior and future) frames. In this case, even when the tentative feature amounts of the current frame are adjusted as in the conventional method, a substantial influence by errors are included without being wanted, and a stable image quality cannot be obtained. Moreover, with the conventional method, since a scene change of a moving image is discriminated by analyzing variations of individual images, the precision of discrimination is low. Furthermore, with the conventional method, since tentative feature amounts are calculated for all frames, a heavy load is imposed on arithmetic processing.

SUMMARY OF THE INVENTION

Hence, it is desirable to provide an image analysis technique and image processing technique, which suppress the influence of feature amount variations, assure a quick response to image changes, can reduce the load on the arithmetic processing, and can realize stable image quality.

The present invention in its first aspect provides an image analysis apparatus comprising: a moving image input unit adapted to receive data representing a moving image of a subject irradiated with X-rays; a determination unit adapted to analyze a previous frame and a current frame of the moving image, and to determine based on the analysis result whether or not any of: a change in relative position between an exposure field of the X-rays and an observation portion of the subject, a change in imaging condition of the moving image, and a change in observation portion of the subject is detected; and a feature amount setting unit adapted to set a feature amount extracted from the current frame in the current frame when the determination unit determines that any of the changes is detected, and to set a feature amount extracted from the previous frame in the current frame when the determination unit determines that no change is detected.

The present invention in its second aspect provides an image processing apparatus comprising: an image analysis apparatus comprising: a moving image input unit adapted to receive data representing a moving image of a subject irradiated with X-rays; a determination unit adapted to analyze a previous frame and a current frame of the moving image, and to determine based on the analysis result whether or not any of: a change in relative position between an exposure field of the X-rays and an observation portion of the subject, a change in imaging condition of the moving image, and a change in observation portion of the subject is detected; and a feature amount setting unit adapted to set a feature amount extracted from the current frame in the current frame when the determination unit determines that any of the changes is detected, and to set a feature amount extracted from the previous frame in the current frame when the determination unit determines that no change is detected, and an image processing unit adapted to perform image processing based on a feature amount set by the image analysis apparatus.

The present invention in its third aspect provides an image analysis method executed in an image analysis apparatus which comprises a moving image input unit adapted to receive data representing a moving image of a subject irradiated with X-rays, the method comprising: a determination step of analyzing a previous frame and a current frame of the moving image, and determining based on the analysis result whether or not any of a change in relative position between an exposure field of the X-rays and an observation portion of the subject, a change in imaging condition of the moving image, and a change in observation portion of the subject is detected; and a feature amount setting step of setting a feature amount extracted from the current frame in the current frame when it is determined in determination step that any of the changes is detected, and setting a feature amount extracted from the previous frame in the current frame when it is determined in determination step that no change is detected.

Further features of the present invention will become apparent from the following description of exemplary embodiments (with reference to the attached drawings).

BRIEF DESCRIPTION OF THE DRAWINGS

FIGS. 8A and 8B are tables showing examples of the calculation results of a position change determination unit;

FIGS. 9A and 9B are tables showing examples of the calculation results of an imaging condition change determination unit;

FIGS. 10A and 10B are tables showing examples of the analysis results of a biological information variation analysis unit;

FIGS. 11A to 11C are tables showing examples of analysis/determination results input to a total change determination unit;

FIGS. 15A to 15C are views showing examples of a histogram and trim histogram within an analysis range to be analyzed by the current frame feature extraction unit, and an example of the analysis result;

FIG. 16 is a block diagram showing the arrangement of an image processing unit;

DESCRIPTION OF THE EMBODIMENTS

Embodiments of the present invention will be exemplarily described in detail hereinafter with reference to the drawings. Components described in these embodiments are merely examples, and the technical scope of the present invention is defined by the scope of the claims and is not limited by the following individual embodiments.

First Embodiment

Figure 1:
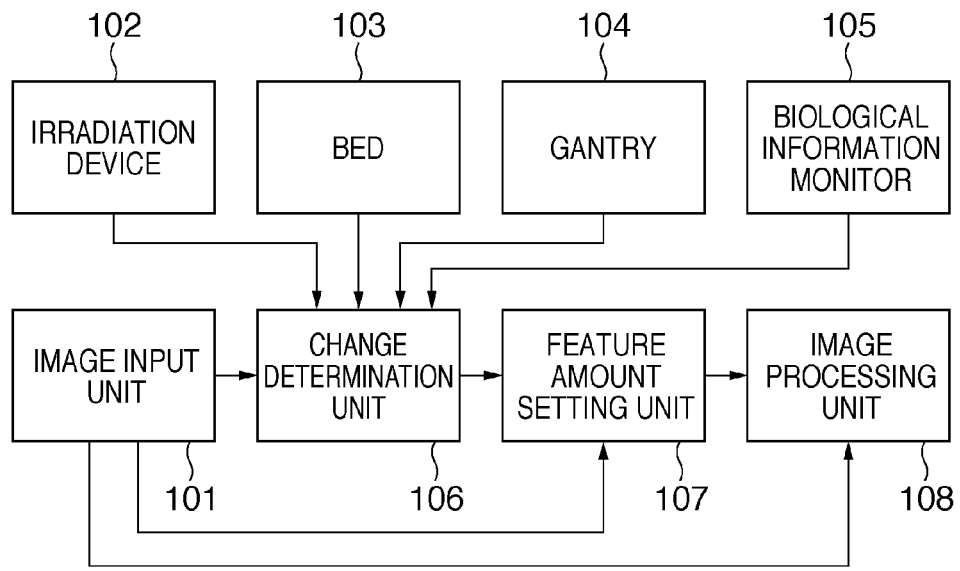
FIG. 1 is a block diagram showing the arrangement of an image processing apparatus according to the first embodiment.
Figure 2:
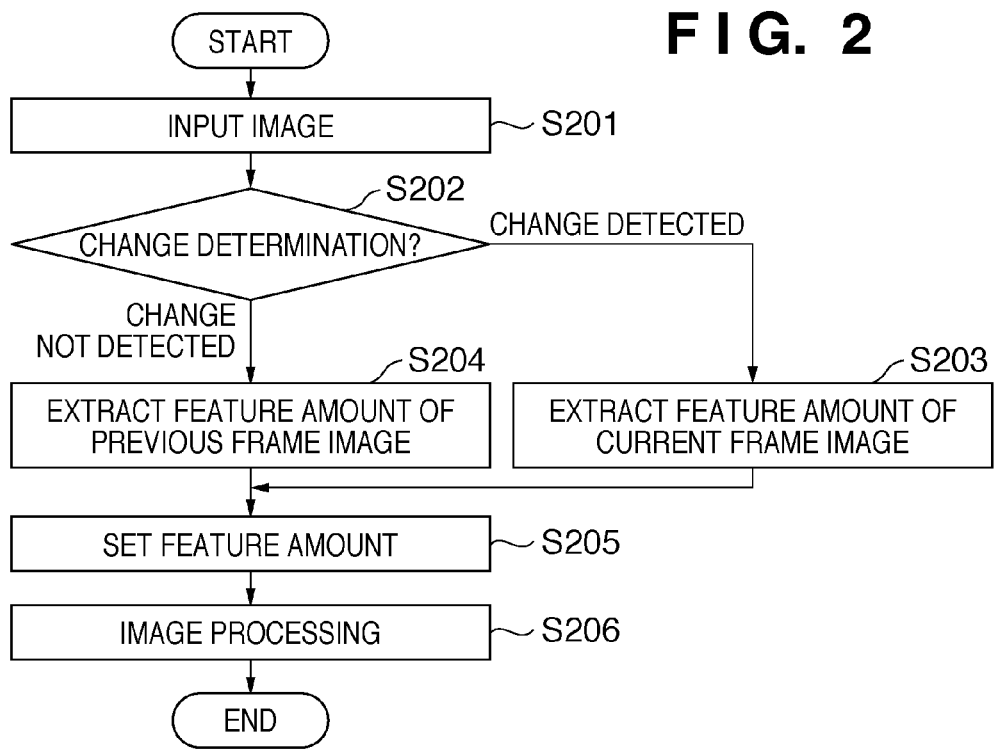
FIG. 2 is a flowchart showing the processing sequence of the image processing apparatus.

A schematic arrangement of an image processing apparatus and the process it performs according to the first embodiment will be described below with reference to the block diagram shown in FIG. 1 and the flowchart shown in FIG. 2.

An image input unit 101 serves as a moving image input unit, and receives an external moving image input. An irradiation device 102 controls the irradiation of a subject (also referred to as an examinee), and outputs its imaging condition information and position information. A bed 103 holds a subject during examination, and outputs its position information. A gantry 104 holds an X-ray sensor, and outputs its position information and a frame rate of the sensor. A biological information monitor 105 monitors biological information of the subject (e.g. a patient/examinee), and outputs that biological information. A change determination unit 106 receives information from the image input unit 101, irradiation device 102, bed 103, gantry 104, and biological information monitor 105. Then, the change determination unit 106 determines the detection and non-detection of changes, i.e., whether or not a large change in relative position between an observation portion (i.e. a portion of the subject that is observed), the irradiation device, and the X-ray sensor is detected; or whether a large change in imaging condition or a large change in observation portion are detected. The conditions that are required for a "large" change to be determined are listed later in this document. A "large" change is simply a change worthy of being noted and may be any change at all or a change larger than a predefined threshold, as will be discussed below. A feature amount setting unit 107 sets feature amounts of an image based on the change determination result received from the change determination unit 106. An image processing unit 108 executes image processing based on the feature amounts set by the feature amount setting unit 107.

The processing sequence of the image processing apparatus will be described below with reference to FIG. 2. In step S201, the image input unit 101 accepts an input of a current frame image (i.e. data representing the image that is present in a current frame of video data). In step S202, the change determination unit 106 receives the input image from the image input unit 101, imaging condition information and X-ray tube position information input from the irradiation device 102, and bed position information input from the bed 103. The change determination unit 106 also receives sensor position information input from the gantry 104 and biological information input from the biological information monitor 105. Then, the change determination unit 106 determines whether or not a (large) change in relative position between an observation portion and exposure field, a (large) change in imaging condition, and/or a (large) change in observation portion are detected. Details of the change determination method by the change determination unit 106 will be described later.

Note that the change determination method by the change determination unit 106 is not limited to a method which receives information from the image input unit 101, irradiation device 102, bed 103, gantry 104, and biological information monitor 105, and determines changes. For example, a method that receives information from only the irradiation device 102, bed 103, and gantry 104 and determines changes therefrom may be used. Alternatively, any other methods of determining whether or not at least one of a change in relative position of the X-ray sensor, a change in imaging condition, and a change in observation portion is detected may be applied.

If the change determination unit 106 determines that changes are detected, the feature amount setting unit 107 performs image analysis processing, and extracts feature amounts of the current frame (S203). If the change determination unit 106 determines that no change is detected, the feature amount setting unit 107 extracts feature amounts set in the previous frame (S204).

In step S205, the feature amount setting unit 107 sets the extracted feature amounts. Details of the feature amount setting method by the feature amount setting unit 107 will be described later. In step S206, the image processing unit 108 performs image processing such as tone conversion processing, sharpening processing, and noise suppression processing based on the feature amounts set by the feature amount setting unit 107, and outputs the processed image. Details of the image processing method by the image processing unit 108 will be described later. Once the aforementioned processes in steps S201 to S206 are executed, a series of processes in the current frame of a moving image ends.

Conventionally, when image correction techniques—that apply corrections to each frame—have been applied to moving image data, correction values used for a current frame have often been different from those used in previous and following frames because each frame was analyzed and corrected independently. The visible effect of this arises as image quality variations. Furthermore, as feature amounts have been calculated for all frames in the conventional methods, a heavy load is imposed on the arithmetic processing of the image data. On the other hand, the present embodiment employs a feature amount setting means (and method) 107 that minimizes the processing load by using the output of the determination means. If the determination means determines that any changes have been detected (as will be described below), a feature amount of the current image will ideally be obtained in order to suppress image quality variations. If there have been no changes, on the other hand, the same feature amount as the previous (unchanged) image can be used, and is used to save processing time. In this latter case, because the image quality variations are small, the feature amount extracted from the previous image available as the feature amount of the current frame without having to calculate the feature amount of the current frame and the processing load is reduced.

Change Determination Processing

Figure 3:
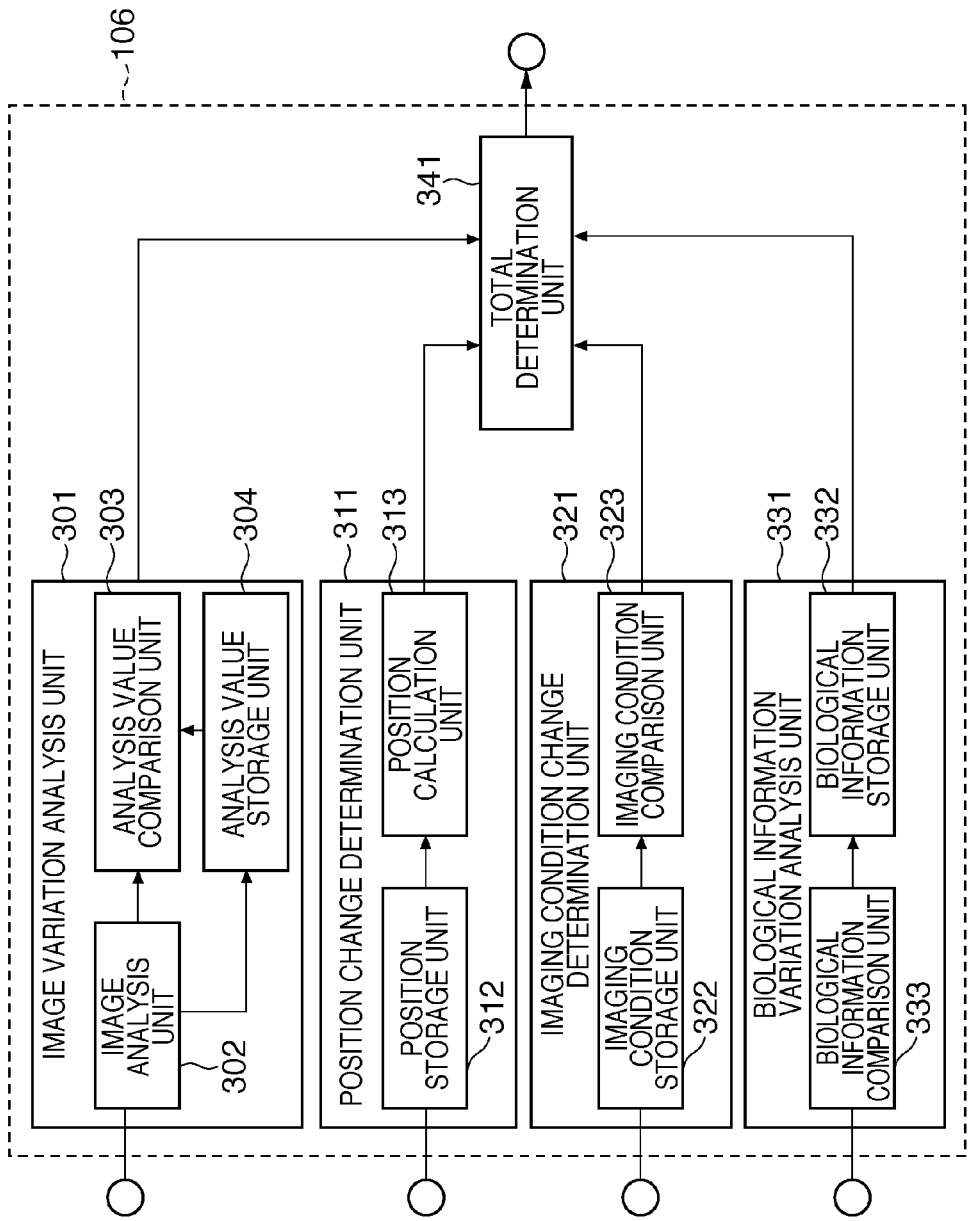
FIG. 3 is a block diagram showing the arrangement of a change determination unit.
Figure 4:
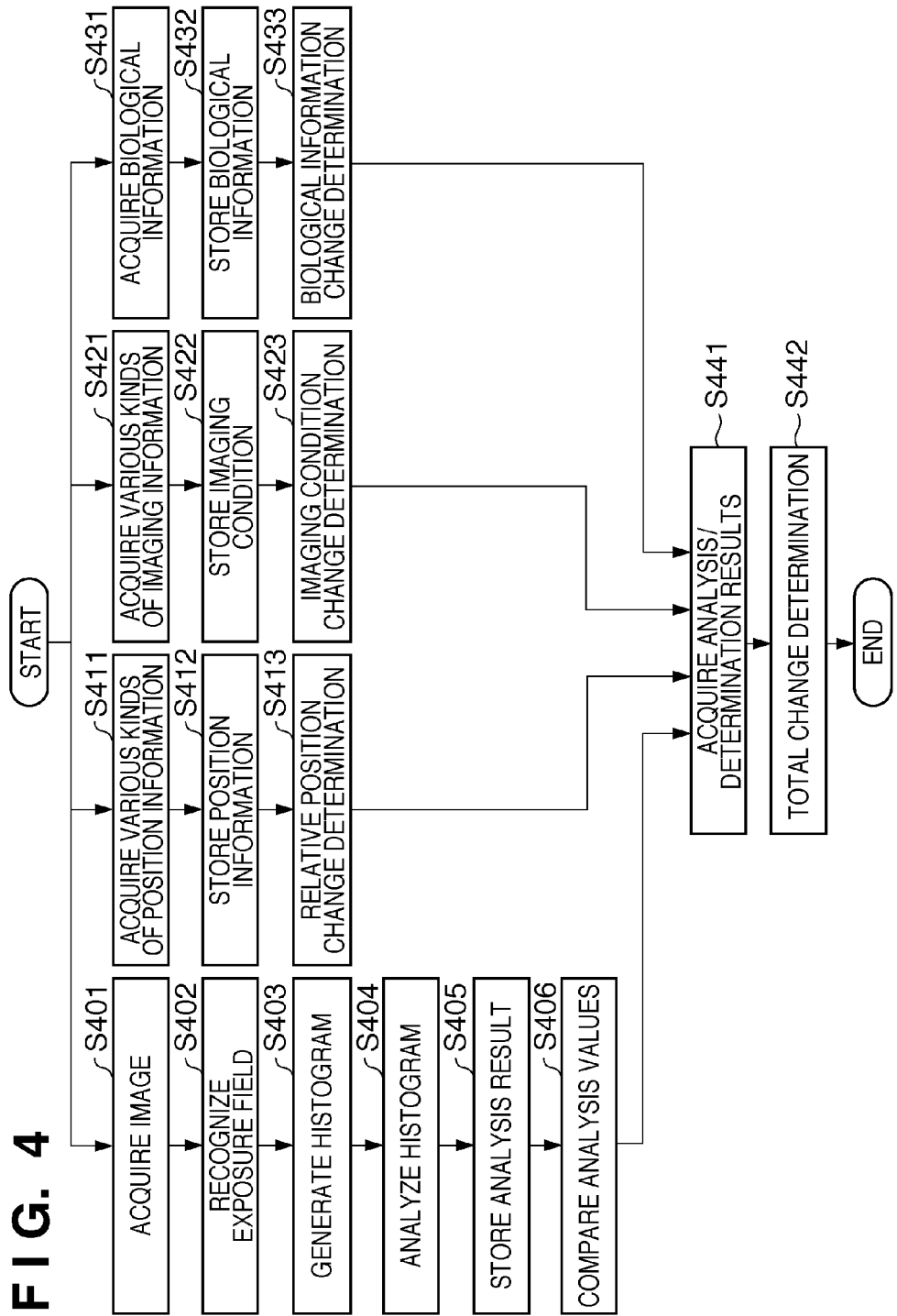
FIG. 4 is a flowchart showing the processing sequence of the change determination unit.

The change determination processing by the change determination unit 106 will be described in detail below with reference to the block diagram shown in FIG. 3 and the flowchart shown in FIG. 4. FIG. 3 is a block diagram showing the arrangement of the change determination unit 106 in detail.

As mentioned above, feature amounts may include characteristics of an image such as color, luminance, tone, brightness, hue and chroma. The feature amount corresponding to a frame constituting a moving image can be obtained by analyzing the frame and detecting these characteristics. The feature amounts between frames that constitute a moving image are changed in accordance with a change in relative position between an exposure field of the X-rays and an observation portion of the subject, a change in imaging condition of the moving image, and a change in the observed portion of the subject.

The change determination unit 106 determines the detection or non-detection of at least one of the changes listed above. When the determination unit determines that any of the changes is or has been detected, the current frame feature amount extraction unit 1204 included in the feature amount setting unit 107 extracts a current feature amount from the current frame and outputs this extracted current feature amount to the feature amount storage unit 1203. In the feature amount storage unit 1203, the current feature amount is stored (or set) in such a way so as to correspond to the frame image from which the current feature amount is extracted. In this way, the feature amount is available for the next frame image if no change is determined as detected by the determination unit between the current frame image and the next frame image.

An image variation analysis unit 301 receives the current frame image from the image input unit 101, and analyzes a degree of variation of the current frame image from the previous frame image.

The image variation analysis unit 301 includes an image analysis unit 302, analysis value comparison unit 303, and analysis value storage unit 304. The image analysis unit 302 analyzes the current frame image, and extracts analysis values. The analysis value comparison unit 303 compares the analysis values of the current frame image with those of the previous frame image, and calculates a comparison result. The analysis value storage unit 304 stores the analysis values of the current frame image and those of the previous frame image. The analysis value of the current frame image is stored for comparison with the subsequent frame image. During the subsequent frame image analysis, therefore, the current frame image becomes a previous frame image.

A position change analysis unit 311 receives position information of the X-ray tube in the irradiation device from the irradiation device 102, bed position information from the bed 103, and X-ray sensor position information from the gantry 104, and determines whether or not a relative position between an observation portion (i.e. the portion of subject being observed or imaged) and an exposure field (portion of subject being irradiated) has changed. The position change analysis unit 311 includes a position storage unit 312 and position calculation unit 313. The position storage unit 312 stores pieces of position information regarding the X-ray tube, the bed and the X-ray sensor at acquisition timings of the current frame image and previous frame image. The position calculation unit 313 calculates a change in relative positional relationship between the observation portion and exposure field based on the pieces of position information of the X-ray tube, bed, and X-ray sensor at the acquisition timings of the current frame image and previous frame image.

An imaging condition change determination unit 321 receives X-ray generation conditions such as a tube voltage, tube current, and irradiation time from the irradiation device 102, and the sensor frame rate from the gantry 104, and determines whether or not the imaging conditions have changed. In other words, imaging conditions include tube voltage, tube current, irradiation time and sensor frame rate, as well as other conditions that may be derivable from such values, such as X-ray tube power and amount of radiation detected per frame.

The imaging condition change determination unit 321 includes an imaging condition storage unit 322 and imaging condition comparison unit 323. The imaging condition comparison unit 323 compares the tube voltages, tube currents, irradiation times, and frame rates at the acquisition timings of the current frame image and previous frame image, and calculates the comparison result (i.e. a comparison of the imaging conditions between the current frame and the previous frame to determine whether or not they have changed and outputting the result of the determination as the comparison result). The imaging condition storage unit 322 stores tube voltages, tube currents, irradiation times, and frame rates at the acquisition timings of the current frame image and previous frame image.

A biological information variation analysis unit 331 receives biological information such as heart rate information and respiration phase information from the biological information monitor 105, and analyzes a degree of variation of the biological information at the acquisition timing of the current frame image with respect to the biological information at the acquisition timing of the previous frame image.

The biological information variation analysis unit 331 includes a biological information comparison unit 332 and biological information storage unit 333. The biological information comparison unit 332 compares the biological information at the acquisition timing of the current frame image and the biological information at the acquisition timing of the previous frame image, and calculates their comparison result. The biological information storage unit 333 stores the biological information at the acquisition timing of the current frame image and at the acquisition timing of the previous frame image.

A total change determination unit 341 receives the image variation analysis result from the image variation analysis unit 301, the position change determination result from the position change determination unit 311, the imaging condition determination result from the imaging condition change determination unit 321, and the biological information variation analysis result from the biological information variation analysis unit 331. Then, the total change determination unit 341 determines whether or not a large change in relative position between the observation portion and exposure field and a large change in imaging condition are detected.

A series of processes of the change determination method executed by the change determination unit 106 will be described below with reference to FIG. 4. Steps S401 to S406, S411 to S413, S421 to S423, and S431 to S433 of this flowchart operate in parallel, and steps S441 and S442 are executed at the time of completion of these processes.

Steps S401 to S406 executed by the image variation analysis unit 301 will be described first. This embodiment will describe in detail a case in which the current frame is not the first frame at the beginning of imaging. When the current frame is the first frame at the beginning of imaging, the total change determination unit 341 cannot determine that any change has been detected, as there is no previous frame with which to compare the current frame. Nevertheless, in the case of the first frame, the change determination unit 341 outputs the result "change detected" to the feature amount setting unit 107 so that the feature amount setting unit 107 treats the current frame as a frame for which the current feature amount must be extracted and used.

The image analysis unit 302 in the image variation analysis unit 301 receives the current frame image (S401). The image analysis unit 302 recognizes an exposure field using the current frame image, and discriminates a portion irradiated with X-rays and other portions in the sensor (S402). Various methods about exposure field recognition have been proposed. For example, methods proposed by Japanese Patent Laid-Open No. 2000-271107, Japanese Patent Laid-Open No. 2003-33968, and the like may be used.

Figure 5A:
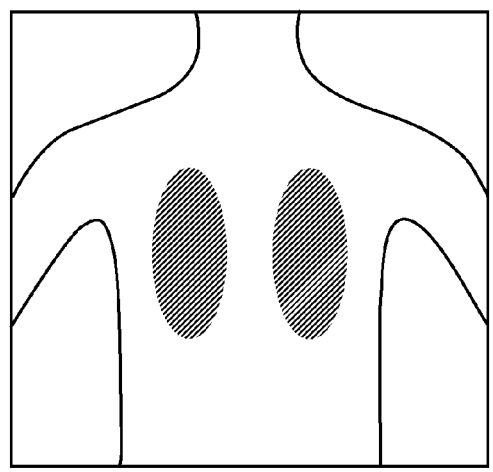
FIGS. 5A to 5C are views showing an example of a current frame image to be analyzed by an image variation analysis unit, and examples of a histogram of the current frame image and accumulated histogram.
Figure 5B:
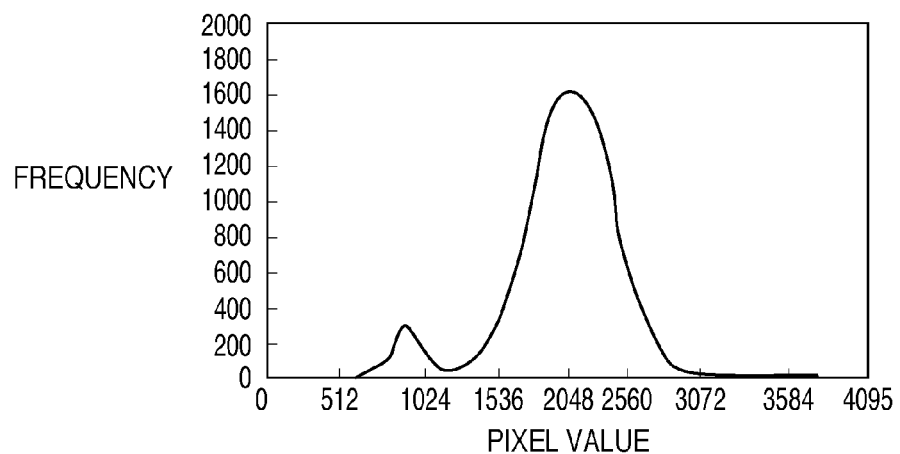
Figure 5C:
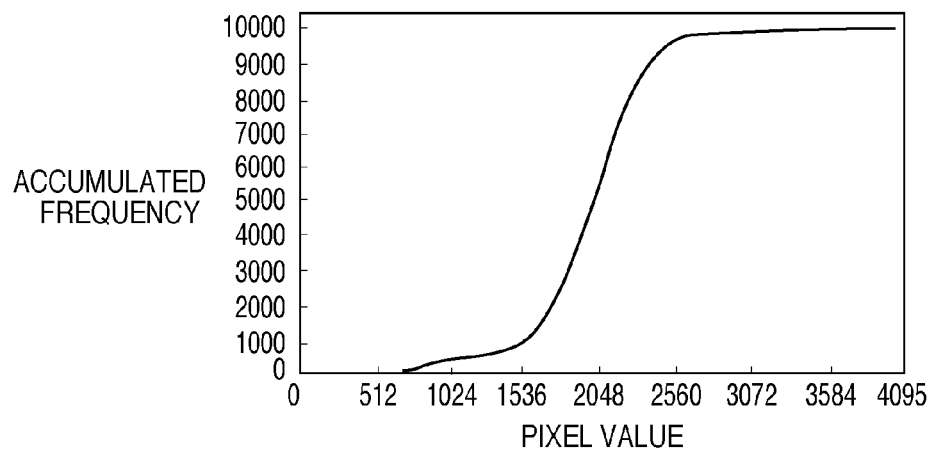

The image analysis unit 302 generates a histogram indicating the distribution of image (i.e. pixel output frequency) values in the exposure field (S403). The image analysis unit 302 analyzes the generated histogram and calculates analysis values (S404). An example of histogram analysis will be described below using FIGS. 5A to 5C. FIG. 5A shows the current frame image. This image has the number of tones=4096 and a size=100×100 pixels (or other appropriate image units) in the exposure field. The image analysis unit 302 generates a histogram in the exposure field of this image (FIG. 5B). In other words, the histogram shown in FIG. 5B has in its x-axis pixel value within the exposure field and frequency output of each pixel in the y-axis. The image analysis unit 302 generates an accumulated (i.e. displaying cumulative pixel frequency in the y-axis) histogram (FIG. 5C) from the histogram of FIG. 5B, and calculates first pixel values for which accumulated frequencies are 5% or more, 50% or more, and 95% or more of the total frequency as a minimum value, intermediate value, and maximum value. This histogram analysis is merely an example. Alternatively or additionally, various other methods may be used. For example, a method of extracting a modal value of the histogram as a representative value, i.e., an analysis value may be used.

Figures 6, 7:
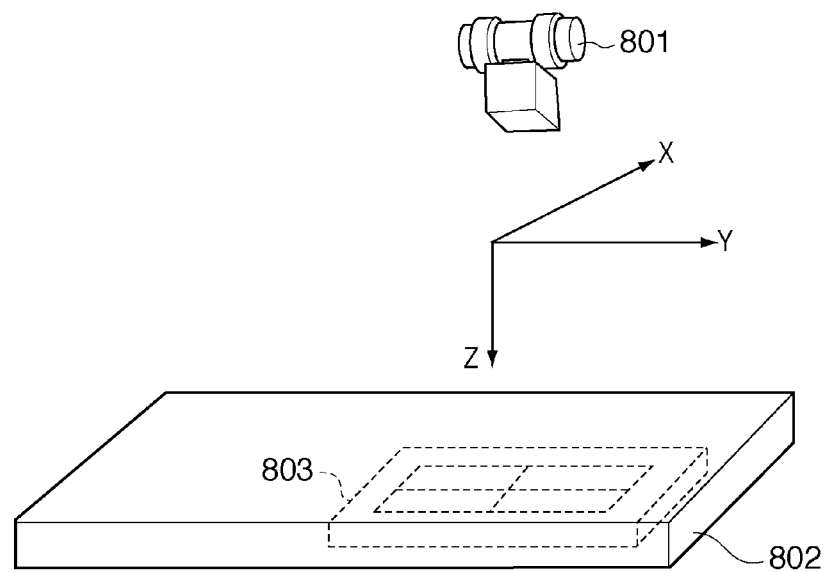
FIG. 6 is a table showing an example of the analysis result of the image variation analysis unit.
FIG. 7 is a view showing an example of an imaging system.

Next, the analysis value storage unit 304 stores the image analysis result of the current frame (S405). The analysis value comparison unit 303 calculates differences between the image analysis values at the acquisition timing of the current frame and those at the acquisition timing of the previous frame, and outputs the calculated differences to the total change determination unit 341 (S406). FIG. 6 shows an example of the image analysis values of the current frame, those of the previous frame, and their differences. As can be seen from FIG. 6, a variation amount of the minimum values is −50, that of the intermediate values is +52, and that of the maximum values is +212. The differences of the minimum values, intermediate values, and maximum values are calculated as the histogram analysis by the image variation analysis unit 301. However, the present invention is not limited to this example. For example, a method of calculating average values within certain ranges from the central point of an image, and calculating a difference between average values may be used. Also, various other methods that allow comparison between images such as a method of calculating a sum total of values representing pixel value differences between images, and a method of performing comparison of motion vectors between images may be applied.

Steps S411 to S413 executed by the position change determination unit 311 will be described below. The position storage unit 312 in the position change determination unit 311 receives the position information of the X-ray tube in the irradiation device from the irradiation device 102, the bed position information from the bed 103, and the X-ray sensor position information from the gantry 104 at the acquisition timing of the current frame image (S411). Then, the position storage unit 312 stores the information regarding the position of the X-ray tube in the irradiation device from the irradiation device 102, the bed position information from the bed 103, and the X-ray sensor position information from the gantry 104 at the acquisition timing of the current frame image (S412).

The position calculation unit 313 then performs relative position change determination between the exposure field and observation portion based on pieces of the position information of the X-ray tube, bed, and X-ray sensor at the acquisition timings of the current and previous frame images (S413). Then, the position calculation unit 313 outputs the result to the total change determination unit 341 (S413). An example of the position change determination method executed by the position change determination unit 313 will be described below. FIG. 7 is a view showing an X-ray tube 801, bed 802, and gantry 803, and position information in the X-, Y-, and Z-directions. FIGS. 8A and 8B are tables showing pieces of position information, from an origin or a respective origin, of the X-ray tube, of the bed, and of the X-ray sensor at the acquisition timings of the current and previous frame images, and position differences between the frames. Note that the origins may be different for each object and may be positions at the beginning of image sensing. As shown in FIG. 8A, from the position at the acquisition timing of the previous frame image, the X-ray tube has moved by 0 cm in the X-direction, 0 cm in the Y-direction, and 0 cm in the Z-direction, and the bed has moved by +10 cm in the X-direction, −5 cm in the Y-direction, and 0 cm in the Z-direction. Also, the X-ray sensor has moved by +10 cm in the X-direction, −5 cm in the Y-direction, and 0 cm in the Z-direction. As shown in FIG. 8B, from the position at the acquisition timing of the previous frame image, the X-ray tube has moved by +10 cm in the X-direction, +10 cm in the Y-direction, and +5 cm in the Z-direction, and the bed has moved by +10 cm in the X-direction, +10 cm in the Y-direction, and +5 cm in the Z-direction. Also, the X-ray sensor has moved by +10 cm in the X-direction, +10 cm in the Y-direction, and +5 cm in the Z-direction.

An example of conditions that allow to determine that the relative positional relationship has not changed is as follows.

$X$(tube moving amount)=$X$(bed moving amount)=$X$ (X-ray sensor moving amount)

and $Y$(tube moving amount)=$Y$(bed moving amount)=$Y$(X-ray sensor moving amount)

and $Z$(tube moving amount)=$Z$(bed moving amount)=$Z$(X-ray sensor moving amount)

From the above conditions, a result "relative position change detected" is determined in case of FIG. 8A, and a result "relative position change not detected" is determined in case of FIG. 8B.

Note that as the relative position change determination method, various other methods that determine a change in relative positional relationship among the X-ray tube, bed, and X-ray sensor may be applied in addition to the aforementioned method. For example, a method of receiving information from the irradiation device 102, bed 103, and gantry 104 only when any of the X-ray tube, bed, and X-ray sensor have moved, and calculating the moving amounts may be applied. Alternatively, a method of determining that the positions have changed when only one or two of the X-ray tube, bed, and X-ray sensor have moved may be applied. Alternatively, a method of determining that the positions have changed when respective moving amount differences are equal to or larger than a threshold (e.g., ±1 cm), and determining that the positions have not changed when the differences are less than the threshold range may be applied.

Steps S421 to S423 executed by the imaging condition change determination unit 321 will be described below. The imaging condition storage unit 322 in the imaging condition change determination unit 321 receives imaging conditions such as a tube voltage, tube current, and irradiation time from the irradiation device 102 and a frame rate of the X-ray sensor from the gantry 104 at the acquisition timing of the current frame image (S421). The imaging condition storage unit 322 stores information of the tube voltage, tube current, irradiation time, and frame rate at the acquisition timing of the current frame image (S422).

Next, the imaging condition comparison unit 323 performs imaging condition change determination from pieces of tube voltage information, pieces of tube current information, pieces of irradiation time information, and pieces of frame rate information at the acquisition timings of the current and previous frame images. Then, the imaging condition comparison unit 323 outputs that result to the total change determination unit 341 (S423). An example of the imaging condition change determination performed by the imaging condition comparison unit 323 will be described below. FIGS. 9A and 9B are tables showing the pieces of tube voltage information, pieces of tube current information, pieces of irradiation time information, and pieces of frame rate information at the acquisition timings of the current and previous frame images, and differences of respective conditions. FIG. 9A shows an example in which the tube voltage has changed by +5 kV, the tube current has changed by +50 mA, the irradiation time has changed by 0 ms, and the frame rate has changed by 0 fps from the acquisition timing of the previous frame image. FIG. 9B shows an example in which the tube voltage has changed by +2 kV, the tube current has changed by 0 mA, the irradiation time has changed by 0 ms, and the frame rate has changed by 0 fps.

An example of conditions that allow to determine that the imaging conditions have not changed is as follows.

−3 (kV)<tube voltage(change amount)<3 (kV)

and tube current(change amount)=0 (mA)

and irradiation time(change amount)=0 (msec)

and frame rate(change amount)=0 (fps)

From the above conditions, the result "imaging condition change detected" is determined in case of FIG. 9A, and "imaging condition change not detected" is determined in case of FIG. 9B. Note that as the imaging condition change determination method, a method of receiving information from the irradiation device 102 and gantry 104 when any of the tube voltage, tube current, irradiation time, and frame rate has changed, and calculating change amounts may be applied in addition to the aforementioned method. Alternatively, a method of determining that the imaging conditions have changed when any of the tube voltage, tube current, irradiation time, and frame rate has changed may be applied.

Next, steps S431 to S433 executed by the biological information variation analysis unit 331 will be described below. In this case, as biological information analysis, analysis of a respiration phase obtained from an organ of respiration will be exemplified. The biological information storage unit 332 in the biological information variation analysis unit 331 receives respiration phase information at the acquisition timing of the current frame image (S431). The biological information storage unit 332 stores the respiration phase information at the acquisition timing of the current frame image (S432). Then, the biological information analysis unit 333 performs respiration phase variation analysis based on respiration phases at the acquisition timings of the current and previous frame images, and outputs that result to the total change determination unit 341 (S433). An example of the respiration phase variation analysis performed by the biological information analysis unit 333 will be described below. FIGS. 10A and 10B are tables showing an example of respiration phases at the acquisition timings of the current and previous frame images, and change states. In FIG. 10A, the respiration phase at the acquisition timing of the previous frame image is an inspiratory (i.e. during inhalation) phase, while that at the acquisition timing of the current frame image is an expiratory phase. As can be seen from FIG. 10B, the respiration phase at the acquisition timing of the previous frame image is an expiratory phase, while that at the acquisition timing of the current frame image is also an expiratory phase. Note that as the biological information change analysis method, a method of determining if each of an expiratory phase and inspiratory phase corresponds to an early stage or last stage may be applied in addition to the aforementioned method. Alternatively, various other methods of analyzing variations of biological information such as a method of receiving information from an electrocardiogram as biological information, and analyzing changes of a diastole phase and systole phase may be applied.

The total change determination method executed by the total change determination unit 341 will be described below. The total change determination unit 341 receives the image variation analysis result of the image variation analysis unit 301, and the relative position change determination result of the position change determination unit 311 (S441). Also, the total change determination unit 341 receives the imaging condition change determination result of the imaging condition change determination unit 321, and the biological information variation analysis result of the biological information variation analysis unit 331 (S441). Then, the total change determination unit 341 determines from the acquired analysis/determination results whether or not a large change in relative position between the observation portion and exposure field, a large change in imaging condition, and a large change in observation portion are detected, and outputs the determination result to the feature amount setting unit 107 (S442).

An example of the total change determination method executed by the total change determination unit 341 will be described below. FIGS. 11A to 11C show examples of the acquired analysis/determination results. In FIG. 11A, the image variation analysis result indicates [minimum value=−20, intermediate value=−30, maximum value=−40], and the relative position change determination result indicates [relative position change not detected]. Also, the irradiation condition change determination result indicates [irradiation condition change not detected], and the biological information analysis result indicates [expiratory phase→expiratory phase]. In FIG. 11B, the image variation analysis result indicates [minimum value=+100, intermediate value=+150, maximum value=+100], and the relative position change determination result indicates [relative position change detected]. Also, the irradiation condition change determination result indicates [irradiation condition change detected], and the biological information analysis result indicates [inspiratory phase→inspiratory phase]. In FIG. 11C, the image variation analysis result indicates [minimum value=+50, intermediate value=+60, maximum value=+100], and the relative position change determination result indicates [relative position change not detected]. Also, the irradiation condition change determination result indicates [irradiation condition change not detected], and the biological information analysis result indicates [inspiratory phase→expiratory phase].

An example of conditions that allow to determine that a large change in relative position between the observation portion and exposure field, a large change in imaging condition, and a large change in observation portion are detected is as follows.

(Condition 1) When the change determination result of the relative position between the observation portion and exposure field is "change detected".

(Condition 2) When the imaging condition change determination result is "change detected".

(Condition 3) When the variation analysis results of respective images are all ±100 or more.

(Condition 4) When the variation analysis results of respective images are all ±50 or more and the respiration phase variation analysis result is [expiratory phase→expiratory phase] or [inspiratory phase→expiratory phase].

When one or more of Conditions 1 to 4 are satisfied, it is determined that a large change in relative position between the observation portion and exposure field, a large change in imaging condition, and a large change in observation portion are detected.

From the above conditions, the result "change not detected" is determined in case of FIG. 11A, "change detected is determined in case of FIG. 11B, and "change detected" is determined in case of FIG. 11C. Condition 4 is used to determine, when an image includes a relatively large change which is not an apparent variation corresponding to a large change in observation portion, whether or not that change is caused by the motion of the observation portion due to respiration. By adding Condition 4, determination errors due to the motion of the observation portion can be eliminated. Even when the analysis values do not include any large change, determination precision as to whether or not to update can be enhanced using both the imaging condition change determination result and relative position change determination result.

Note that the total change determination conditions are not limited to the aforementioned conditions. For example, a method of determining the result "change not detected" even when it is determined that changes in relative position and imaging condition are detected but when all the image analysis results fall within a range of ±50 may be applied. Alternatively, every combination that allows the obtaining of total determination results such as a method of referring to only the image analysis results, and a method of referring to only changes in relative position and imaging condition may be applied.

By executing the series of processes in steps S401 to S442, the change determination by the change determination unit 106 is complete.

Feature Amount Setting Processing

Figure 12:
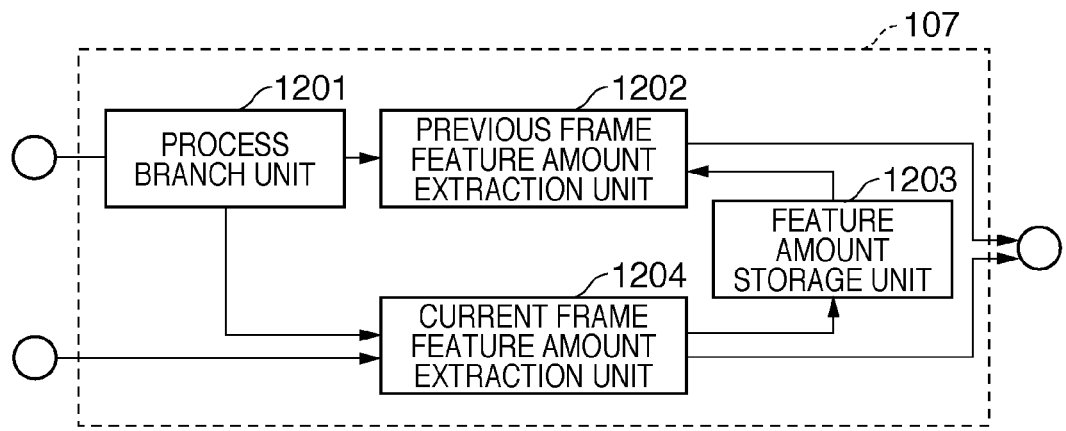
FIG. 12 is a block diagram showing the arrangement of a feature amount setting unit.

The feature amount setting processing by the feature amount setting unit 107 will be described in detail below with reference to the block diagram shown in FIG. 12 and the flowchart shown in FIG. 13.

The feature amount setting unit 107 includes a process branch unit 1201, previous frame feature amount extraction unit 1202, feature amount storage unit 1203, and current frame feature amount extraction unit 1204.

The process branch unit 1201 receives the change determination result from the change determination unit 106, and branches processes. The current frame feature amount extraction unit 1204 receives information indicating that the process is to be executed from the process branch unit 1201, and the current frame image from the image input unit 101, extracts feature amounts from the current frame image, and outputs the extracted feature amounts to the image processing unit 108 and feature amount storage unit 1203. The feature amount storage unit 1203 receives and stores the feature amounts of the current frame image from the current frame feature amount extraction unit 1204. The previous frame feature amount extraction unit 1202 receives information indicating that the process is to be executed from the process branch unit 1201 and feature amounts of the previous frame image from the feature amount storage unit 1203, and outputs the feature amounts to the image processing unit 108.

A series of processes of the feature amount setting method executed by the feature amount setting unit 107 will be described below with reference to FIG. 13.

Figure 13:
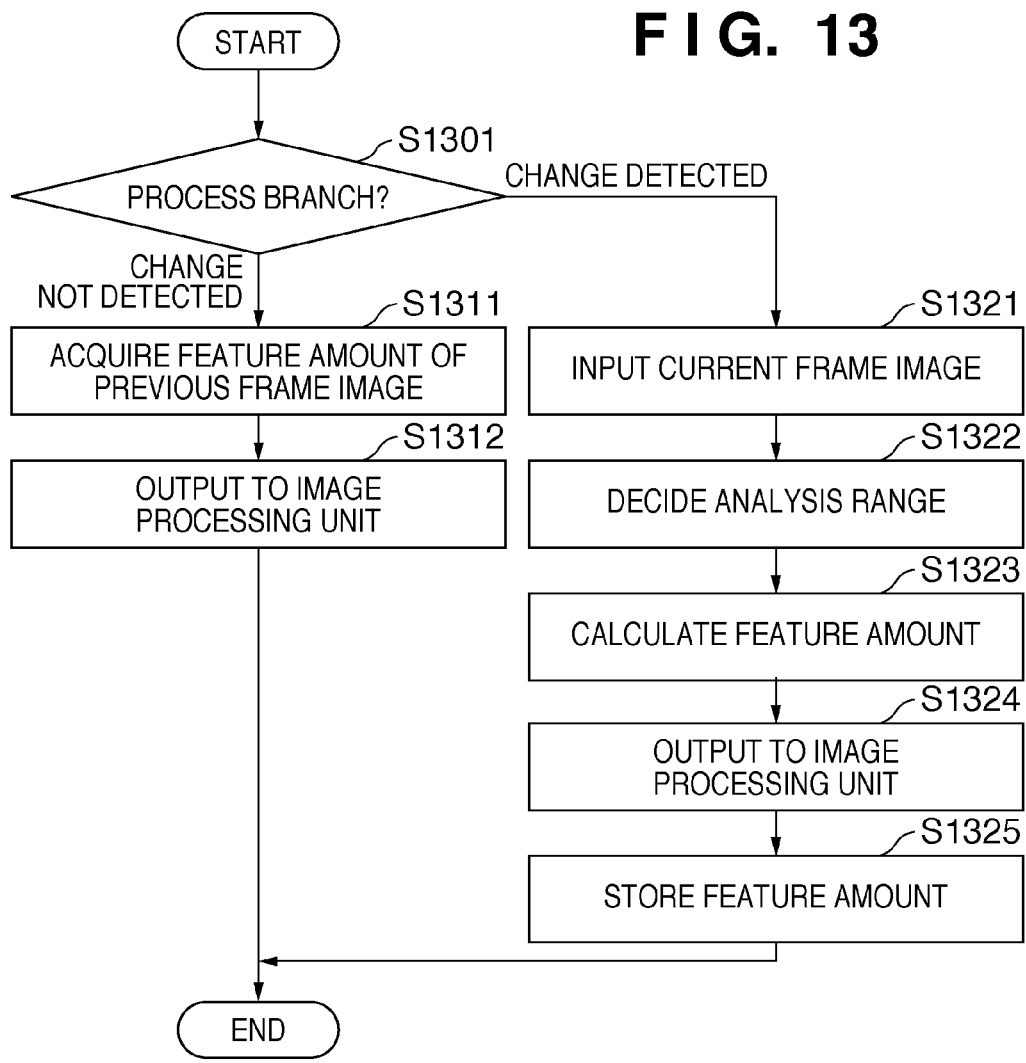
FIG. 13 is a flowchart showing the processing sequence of the feature amount setting unit.

At the end timing of step S1301 in FIG. 13, either processes in steps S1311 and S1312 performed by the previous frame feature amount extraction unit 1202 or those in steps S1321 to S1325 performed by the current frame feature amount extraction unit 1204 are executed. That is, when steps S1311 and S1312 performed by the previous frame feature amount extraction unit 1202 are to be executed, steps S1321 to S1325 are skipped. When steps S1321 to S1325 performed by the current frame feature amount extraction unit 1204 are executed, steps S1311 and S1312 are skipped.

The process branch method performed by the process branch unit 1201 will be described first. The process branch unit 1201 branches processes based on the determination result acquired from the change determination unit 106. When the determination result acquired from the change determination unit 106 indicates [variation not detected], the process branch unit 1201 instructs the previous frame feature amount extraction unit 1202 to operate. When the determination result indicates [variation detected], the process branch unit 1201 instructs the current frame feature amount extraction unit 1204 to operate (S1301).

Previous Frame Feature Amount Extraction Processing

Upon reception of an operation instruction from the process branch unit 1201, the previous frame feature amount extraction unit 1202 acquires feature amounts of the previous frame from the feature amount storage unit 1203 (S1311). The previous frame feature amount extraction unit 1202 outputs the acquired feature amounts to the image processing unit, thus ending the processing (S1312).

Current Frame Feature Amount Extraction Processing

Upon reception of an operation instruction from the process branch unit 1201, the current frame feature amount extraction unit 1204 acquires the current frame image from the image input unit 101 (S1321). Next, the current frame feature amount extraction unit 1204 decides an analysis range for the acquired image (S1322). This is to improve the analysis precision and to reduce a time required for analysis by narrowing down the image analysis range.

Figure 14:
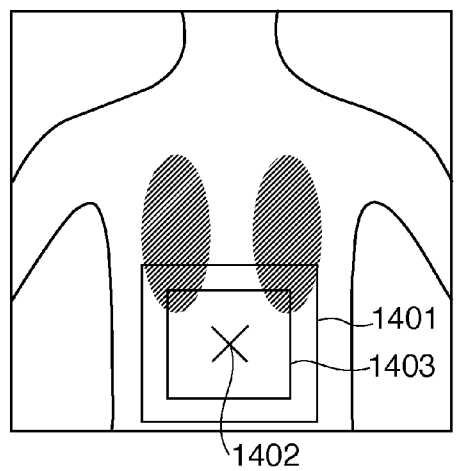
FIG. 14 is a view showing an example of the current frame image to be analyzed by a current frame feature amount extraction unit.

An example of the analysis range decision method will be described below. FIG. 14 shows the current frame image, and a range bounded by a rectangle 1401 corresponds to an exposure field irradiated with X-rays. When a central point in the exposure field of the current frame image is calculated, a central point 1402 can be calculated. A range of 70% of the area of the exposure field from the central point 1402 is calculated, and it can be defined as an analysis range 1403. Note that various other methods of deciding the analysis range such as a method of calculating a barycenter of pixel values, and defining a range having a length of 15 cm and a width of 15 cm to have the barycenter as the center, and a method of entirely defining the interior of the exposure field as an analysis range may be applied in addition to the aforementioned analysis range decision method.

Figure 15A:
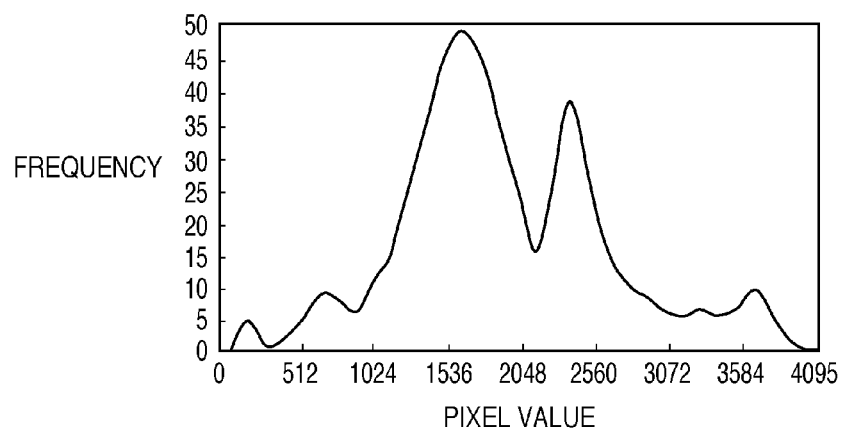
Figure 15B:
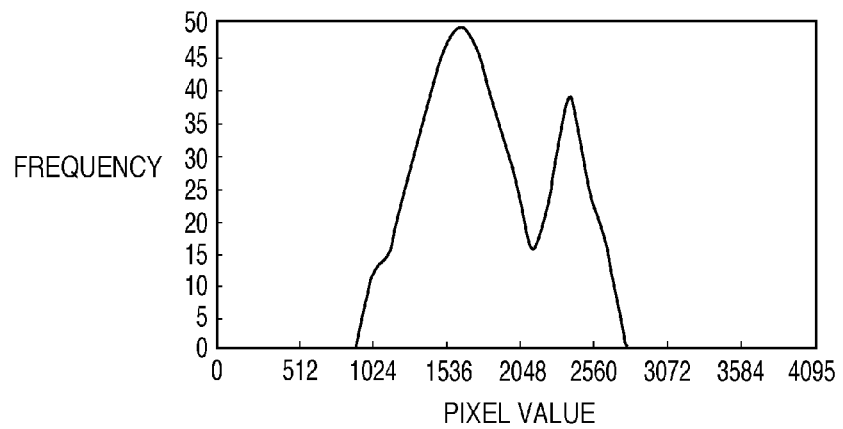

The current frame feature amount extraction unit 1204 calculates feature amounts within the decided analysis range (S1323). An example of the feature amount calculation method will be described below. FIG. 15A shows a histogram generated using pixel values within only the analysis range 1403 in FIG. 14. FIG. 15B shows a trim histogram generated by setting the values of frequencies equal to or smaller than a certain threshold (e.g., 10) to be zero in FIG. 15A. A minimum value, maximum value, and intermediate value of the trim histogram shown in FIG. 15B are respectively calculated as feature amounts. FIG. 15C shows an example in which the minimum value, maximum value, and intermediate value of the trim histogram shown in FIG. 15B are respectively calculated as feature amounts. Note that various other methods of extracting feature amounts of the current frame image such as a method of calculating variance and average values within the analysis range and a method of calculating a difference between the minimum and maximum values may be applied in addition to the aforementioned feature amount calculation method.

Next, the current frame feature amount extraction unit 1204 outputs the calculated feature amounts to the image processing unit 108 (S1324). The current frame feature amount extraction unit 1204 then outputs the calculated analysis values (feature amounts) to the feature amount storage unit 1203, which stores the received feature amounts (S1325), thus ending the processing.

Note that as the current frame feature amount extraction method, various other methods of extracting feature amounts such as a method of defining the analysis values of the current frame calculated by the image variation analysis unit 301 in the change determination unit 106 as feature amounts may be applied in addition to the aforementioned method.

By executing the processes in steps S1301 to S1325 as needed, the feature amount setting processing by the feature amount setting unit 107 is complete.

The image processing method by the image processing unit 108 will be described in detail below with reference to the block diagram shown in FIG. 16 and the flowchart shown in FIG. 17.

The image processing unit 108 includes a tone processor 1601, sharpening processor 1602, and noise suppression processor 1603. The tone processor 1601 receives the current frame image from the image input unit 101 and the feature amounts from the feature amount setting unit 107, and performs tone processing. The sharpening processor 1602 receives the image after the tone processing from the tone processor 1601 and the feature amounts from the feature amount setting unit 107, and performs sharpening processing so as to sharpen the edge of a subject image. The noise suppression processor 1603 receives the image after the sharpening processing from the sharpening processor 1602 and the feature amounts from the feature amount setting unit 107, and performs noise suppression processing.

Figure 17:
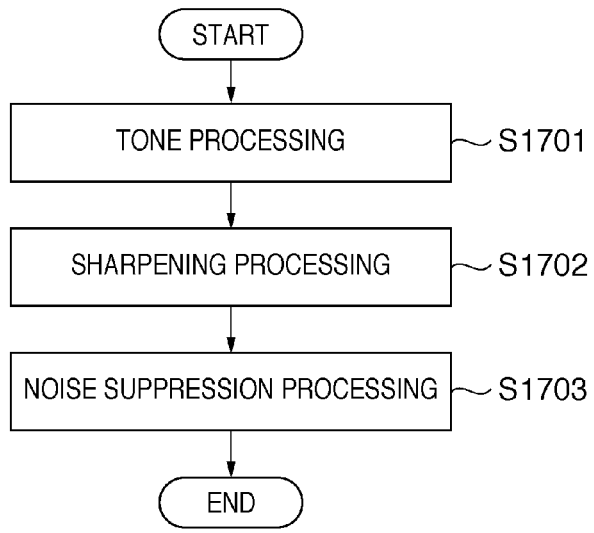
FIG. 17 is a flowchart showing the processing sequence of the image processing unit.

FIG. 17 is a flowchart showing a series of processes of the image processing method performed by the image processing unit 108. The tone processor 1601 performs the tone processing based on the current frame image acquired from the image input unit 101 and the feature amounts acquired from the feature amount setting unit 107 (S1701). An example of the tone processing method by the tone processor 1601 will be described below.

The tone processor 1601 acquires the feature amounts (minimum value, intermediate value, and maximum value) from the feature amount setting unit 107. The tone processor 1601 generates a lookup table (to be abbreviated as an LUT hereinafter) required to convert pixel values of the current frame image into those after the tone conversion processing, based on the feature amounts, and a standard pixel value and fixed value conversion value, which are set in advance.

Figure 18:
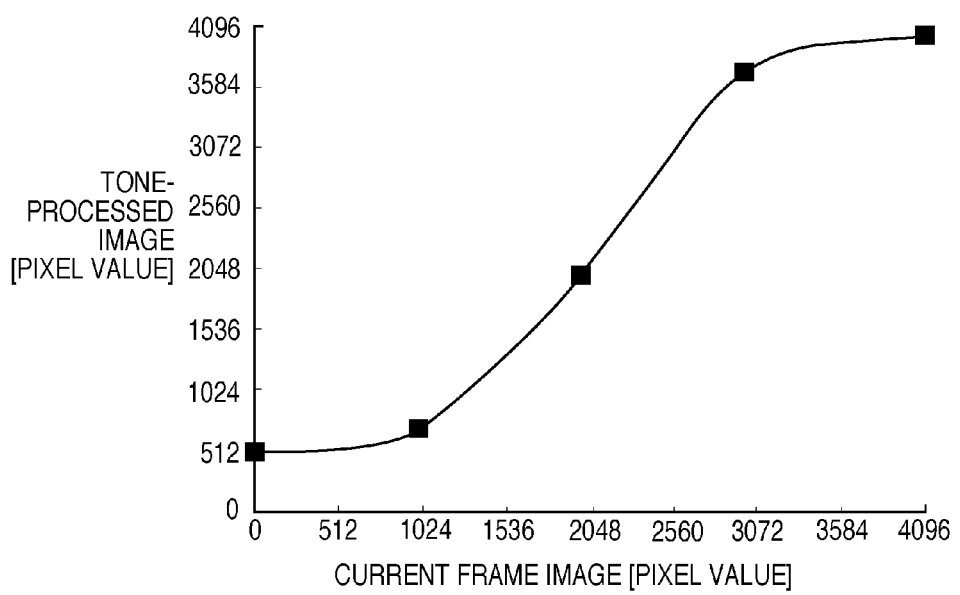
FIG. 18 is a graph showing an example of an LUT generated by the image processing unit.

FIG. 18 shows an example of the LUT generated based on the feature amounts shown in FIG. 15C. In this LUT, points which respectively convert a pixel value "0" of the current frame image into "512" and "4095" into "4095", and also convert the minimum value as the feature amount into "700", the intermediate value into "2000", and the maximum value into "3700", and table values between neighboring points are calculated by spline interpolation. The tone processor 1601 converts respective pixel values of the current frame image with reference to the LUT, thereby generating a tone-processed image.

In addition to the aforementioned tone processing method, for example, the following method may be applied. That is, in this method, an image is decomposed based on spatial frequencies to generate a plurality of images having various spatial frequency bands. Then, conversion coefficients or LUTs are generated based on feature amounts of the respective images to apply conversion processing to the respective images. Then, the processed images are reconstructed so as to attain tone conversion.

The sharpening processing method performed by the sharpening processor 1602 will be described below. The sharpening processor 1602 performs the sharpening processing based on the image after the tone processing (tone-processed image) acquired from the tone processor 1601 and the feature amount acquired from the feature amount setting unit 107 (S1702). An example of the sharpening processing by the sharpening processor 1602 will be described below. The sharpening processor 1602 decides emphasis coefficients according to the feature amounts (minimum value, maximum value) acquired from the feature amount setting unit 107. At this time, the emphasis coefficients may be increased with decreasing difference between the minimum value and maximum value. This is because when the difference between the minimum value and maximum value is small, since a dynamic range is narrow, it is difficult even for a high-spatial frequency region to give high contrast. Next, the sharpening processor 1602 applies average value filter processing of 3 pixels×3 pixels to the tone-processed image to generate a blur image. Then, the sharpening processor 1602 performs processing for subtracting the blur image from the tone-processed image (difference processing). After a difference image is generated, the sharpening processor 1602 multiplies this difference image by coefficients, and adds the processed image to the tone-processed image, thereby generating a sharpening-processed image. Note that in addition to the aforementioned sharpening processing method, the following method may be applied. That is, in this method, an image is decomposed based on spatial frequencies to generate a plurality of images having various spatial frequency bands. Then, conversion coefficients or LUTs are generated based on feature amounts of the respective images to apply conversion processing to the respective images. Then, the processed images are reconstructed so as to attain the sharpening processing.

The noise suppression processing method by the noise suppression processor 1603 will be described below. The noise suppression processor 1603 performs noise suppression processing based on the image after the sharpening processing (sharpening-processed image) acquired from the sharpening processor 1602, and the feature amounts acquired from the feature amount setting unit 107 (S1703). An example of the noise suppression processing by the noise suppression processor 1603 will be described below. The noise suppression processor 1603 decides a smoothing filter size according to the feature amount (minimum value) acquired from the feature amount setting unit 107. At this time, smoothing coefficients may be increased with decreasing minimum value. This is because when the minimum value is small, since the dose is small, an image includes a relatively large number of noise components. Next, the noise suppression processor 1603 applies smoothing filter processing to the sharpening-processed image using the decided filter size to generate a noise-suppression processed image. Note that in addition to the aforementioned noise suppression processing method, the following method may be applied. That is, in this method, an image is decomposed based on spatial frequencies to generate a plurality of images having various spatial frequency bands. Then, conversion coefficients or LUTs are generated based on feature amounts of the respective images to apply conversion processing to the respective images. Then, the processed images are reconstructed so as to attain the noise suppression processing.

Note that the method of sequentially applying the tone processing, sharpening processing, and noise suppression processing has been exemplified as the image processing method. In addition, a method of operating these processes in parallel may be applied. Alternatively, a method using the feature amounts in only one process (e.g., tone processing) and using fixed values in other processes may be applied. Alternatively, the processing order of the above three processes may be changed, or one or a plurality of the three processes may be combined.

By executing the series of processes in steps S1701 to S1703, the image processing by the image processing unit 108 is complete.

As described above, according to this embodiment, any influences of feature amount variations can be suppressed, a quick response to image changes can be assured, the load on the arithmetic processing can be reduced, and stable image quality can be realized.

Second Embodiment

A schematic arrangement of an image processing apparatus according to the second embodiment will be described below with reference to the block diagram shown in FIG. 19 and the flowchart shown in FIG. 20. In the arrangement shown in FIG. 19, the same reference numerals denote the same components as in FIG. 1, and a description thereof will not be repeated.

Figure 19:
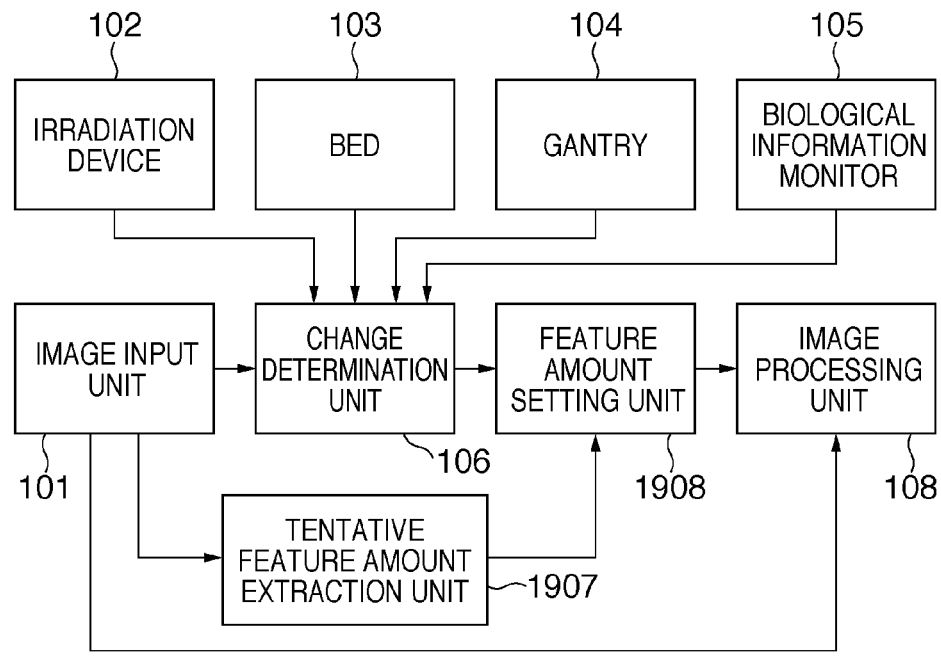
FIG. 19 is a block diagram showing the arrangement of an image processing apparatus according to the second embodiment.
Figure 20:
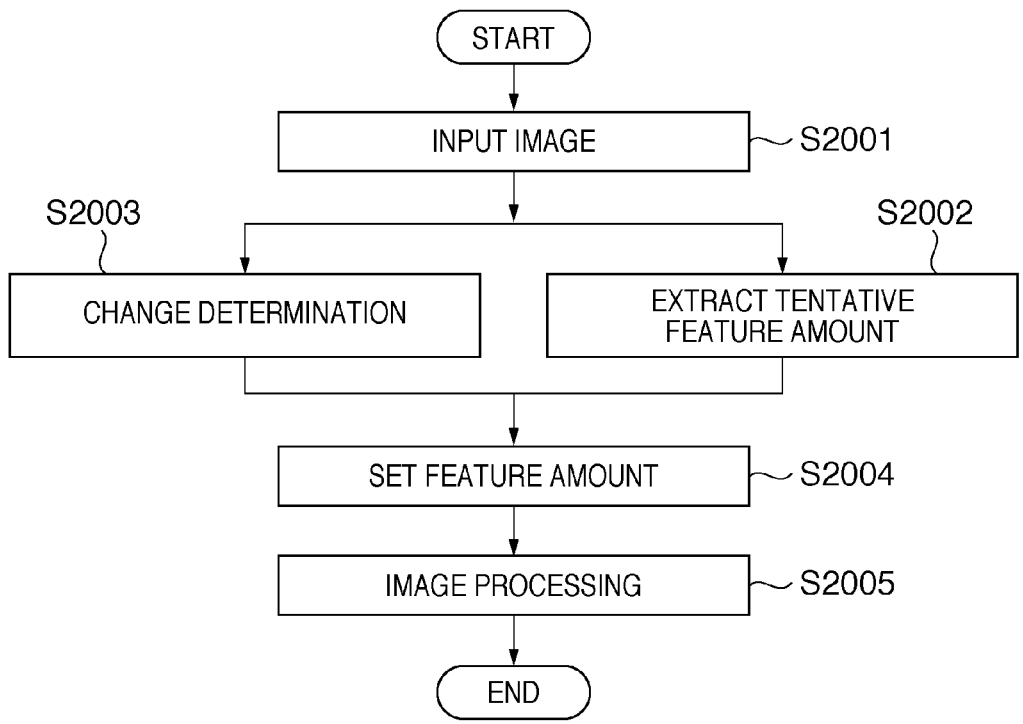
FIG. 20 is a flowchart showing the processing sequence of the image processing apparatus according to the second embodiment.

A tentative feature amount extraction unit 1907 shown in FIG. 19 receives an image from an image input unit 101, and extracts tentative feature amounts. A tentative feature amount is defined as the feature amount obtained by executing, in parallel, a step of extracting feature amounts (tentative feature amounts) of the current frame image (S2002) and a step of determining whether or not any of the changes is detected (S2003). In other words, tentative feature amounts are those that, in the present embodiment, are used for the determination of a detected change between frames, and that are extracted. In the first embodiment, the step S203 of extracting the current feature amount is executed in serial after the determining step (S202—change detected) has been completed. In order to distinguish the feature amounts extracted in S203 of the first embodiment shown in FIG. 2 from the feature amounts extracted in S2002 of the second embodiment shown in FIG. 20, the extracted feature amounts of the second embodiment are labeled "tentative feature amounts". A feature amount setting unit 1908 receives a change determination result from a change determination unit 106 and the tentative feature amounts from the tentative feature amount extraction unit 1907, and sets feature amounts of the image.

An image processing unit 108 performs image processing based on the feature amounts set by the feature amount setting unit 1908.

The processing sequence of the image processing apparatus according to the second embodiment will be described below with reference to FIG. 20. Note that steps S2002 and S2003 in FIG. 20 operate in parallel (rather than in series as in the first embodiment), and at the end times of these processes, processes from step S2004 are executed.

The image input unit 101 accepts an input of one frame (to be referred to as a current frame image hereinafter) in a moving image (S2001).

Next, the tentative feature amount extraction unit 1907 receives the current frame image from the image input unit 101, and extracts feature amounts (tentative feature amounts) of the current frame image (S2002). Note that the tentative feature amount extraction method by the tentative feature amount extraction unit 1907 can use, for example, the same method as the current frame feature amount extraction method by a current frame feature amount extraction unit 1204 in FIG. 12.

The change determination unit 106 receives the input image from the image input unit 101, imaging condition change information and position change information of an X-ray tube input from an irradiation device 102, and bed position change information input from a bed 103. Also, the change determination unit 106 receives sensor position change information input from a gantry 104 and biological information change information input from a biological information monitor 105. Then, the change determination unit 106 determines whether or not a large change in relative position between an observation portion and exposure field, a large change in imaging condition, and a large change in observation portion are detected (S2003). Note that the change determination method by the change determination unit 106 can use the same method as that described in the first embodiment.

If the change determination unit 106 determines that changes are detected, or if it is determined that the current frame is the first frame at the beginning of imaging, the feature amount setting unit 1908 sets the tentative feature amounts extracted by the tentative feature amount extraction unit as feature amounts of the current frame image.

If the change determination unit 106 determines that no changes are detected, and if it is determined that the current frame is not the first frame at the beginning of imaging, the feature amount setting unit 1908 sets feature amounts set for a previous frame image as those of the current frame image (S2004).

Then, the image processing unit 108 performs image processing such as tone conversion processing, sharpening processing, and noise suppression processing based on the feature amounts set by the feature amount setting unit 1908 (S2005), and outputs the processed image. A series of processes in the current frame of the moving image are complete. Note that the image processing method by the image processing unit 108 can use the same method as that described in the first embodiment.

As described above, according to this embodiment, any influences of feature amount variations can be suppressed, a quick response to image changes can be assured, the load on the arithmetic processing can be reduced, and stable image quality can be realized.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-090484, filed Apr. 2, 2009, which is hereby incorporated by reference herein in its entirety.

What is claimed is:

1. An image analysis apparatus comprising:
   a moving image input unit adapted to receive data representing a moving image of a subject irradiated with X-rays;
   a detection unit adapted to detect a change of a previous frame and a current frame of the moving image based on information relate to X-ray imaging; and
   a selection unit adapted to select a feature amount to be set in the current frame the previous frame based on a detection result of the detection unit.

2. The apparatus according to claim 1, where in said detection unit is configured to determine detection/non-detection of the changes based on a comparison result between a distribution of pixel values within the exposure field of the previous frame and a distribution of pixel values within the exposure field of the current frame.

3. The apparatus according to claim 2, wherein the pixel value distribution is represented in the form of a histogram.

4. The apparatus according to claim 2, wherein said detection unit is configured to determine detection/non-detection of the changes based on comparison results of maximum values, minimum values, and intermediate values of frequencies calculated from the pixel value distribution.

5. The apparatus according to claim 1, wherein said detection unit is configured to determine detection-non-detection of the changes based on a comparison result of motion vectors between the previous frame and the current frame.

6. The apparatus according to claim 1, the selection unit is adapted to set a feature amount extracted from the current frame in the current frame when said detection unit detects the change, and to set a feature amount extracted from the previous frame in the current frame when said detection unit does not detect the change.

7. The apparatus according to claim 1, wherein said detection unit is adapted to detect a change in relative position between an exposure field of the X-rays and an observation portion of the subject.

8. The apparatus according to claim 1, wherein said detection unit is adapted to detect a change in imaging condition of the moving image.

9. The apparatus according to claim 1, wherein said detection unit is adapted to detect a change in observation portion of the subject.

10. An image processing apparatus comprising:
    an image analysis apparatus comprising:
       a moving image input unit adapted to receive data representing a moving image of a subject irradiated with X-rays;

a detection unit adapted to detect a change of a previous frame and a current frame of the moving image based on information related to X-ray imaging; and a selection unit adapted to select a feature amount to be set in the current frame based on a feature amount extracted from the current frame and a feature amount extracted from the previous frame based on a detection result obtained by said detection unit; and an image processing unit adapted to perform image processing based on a feature amount selected by said image analysis apparatus.

11. The apparatus according to claim 10, wherein the image processing executed by said image processing unit includes at least one of tone processing, sharpening processing for sharpening an edge of a subject image, and noise suppression processing.

12. An image analysis method executed in an image analysis apparatus which comprises a moving image input unit adapted to receive data representing a moving image of a subject irradiated with X-rays, the method comprising:

a detection step of detecting a change of a previous frame and a current frame of the moving image based on information related to X-ray imaging; and a selection step of selecting a feature amount to be set in the current frame based on a feature amount extracted from the current frame and a feature mount extracted from the previous frame based on a detection result obtained in said detection step.

* * * * *